United States Patent
Kamel et al.

(10) Patent No.: US 11,865,945 B2
(45) Date of Patent: Jan. 9, 2024

(54) RECHARGEABLE ENERGY STORAGE SYSTEM BALANCING APPARATUS

(71) Applicant: GM Global Technology Operations LLC, Detroit, MI (US)

(72) Inventors: Mohamed Kamel, Rochester, MI (US); Chandra S. Namuduri, Troy, MI (US); Rashmi Prasad, Troy, MI (US); Muhammad Hussain Alvi, Troy, MI (US); Lyall Kenneth Winger, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/839,769

(22) Filed: Jun. 14, 2022

(65) Prior Publication Data

US 2023/0398903 A1    Dec. 14, 2023

(51) Int. Cl.
| | |
|---|---|
| B60L 58/22 | (2019.01) |
| H02M 7/537 | (2006.01) |
| B60L 53/60 | (2019.01) |
| H02J 1/10 | (2006.01) |
| B60L 58/18 | (2019.01) |
| H02M 1/00 | (2006.01) |
| H02J 7/00 | (2006.01) |

(52) U.S. Cl.
CPC ............ B60L 58/22 (2019.02); B60L 53/60 (2019.02); B60L 58/18 (2019.02); H02J 1/102 (2013.01); H02J 7/0019 (2013.01); H02M 1/007 (2021.05); H02M 1/0074 (2021.05); H02M 7/537 (2013.01); *B60L 2210/10* (2013.01); *B60L 2210/40* (2013.01); *H02J 2310/48* (2020.01)

(58) Field of Classification Search
CPC ........ H02J 7/0018; H02J 7/0019; H02J 1/102; H02J 2207/20; H02J 2310/48; B60L 2210/10; B60L 58/18; B60L 58/20; B60L 58/21; B60L 58/22; H02M 1/007; H02M 1/0074; H01M 2010/4271
See application file for complete search history.

(56) References Cited

U.S. PATENT DOCUMENTS

| | | | |
|---|---|---|---|
| 8,115,446 B2 * | 2/2012 | Piccard | H02J 7/342 320/128 |
| 10,131,245 B2 | 11/2018 | Hand, III et al. | |
| 10,298,026 B2 | 5/2019 | Trimboli et al. | |
| 10,793,019 B2 * | 10/2020 | Duan | H02J 7/0016 |
| 10,804,809 B1 | 10/2020 | Yelaverthi et al. | |

FOREIGN PATENT DOCUMENTS

DE    102013210293 A1 * 12/2014    ............. B60L 11/18

* cited by examiner

*Primary Examiner* — Ryan Johnson
(74) *Attorney, Agent, or Firm* — CANTOR COLBURN LLP

(57) ABSTRACT

A rechargeable energy storage system may include a series arrangement of a plurality of batteries coupled to a first DC bus at a first DC voltage. A DC to DC converter may include a multi-input DC input stage coupled to a multi-output DC output stage. The multi-input DC input stage may include multiple distributed DC inputs, each distributed DC input being coupled to a respective one of the plurality of batteries. The multi-output DC output stage may include multiple aggregated DC outputs. At least one controllable switch may couple one or more of the multiple aggregated DC outputs to one or more other DC buses.

20 Claims, 8 Drawing Sheets

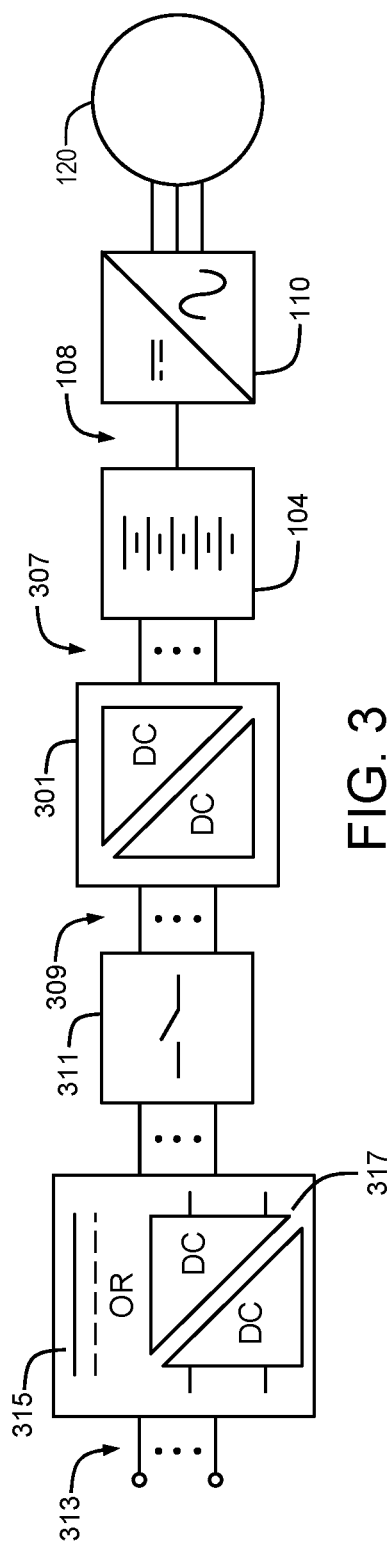
FIG. 3
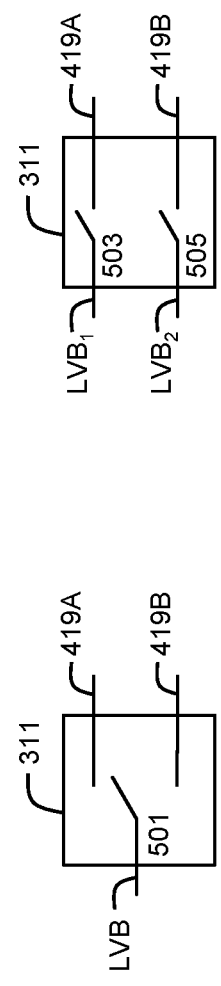
FIG. 5A
FIG. 5B
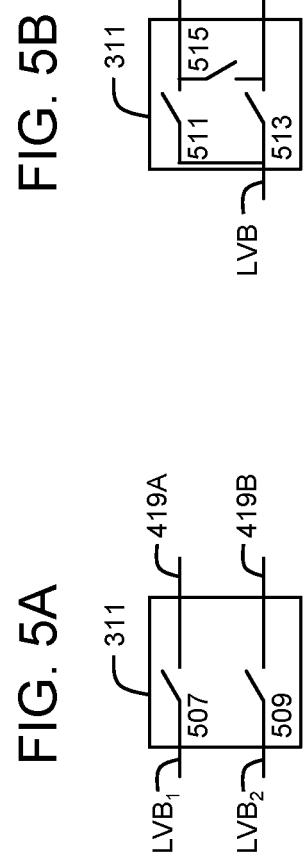
FIG. 5C
FIG. 5D

RECHARGEABLE ENERGY STORAGE SYSTEM BALANCING APPARATUS

INTRODUCTION

The subject disclosure relates to rechargeable energy storage systems. More particularly, the disclosure is concerned with flexible and efficient balancing of high voltage rechargeable energy storage systems.

Individual capacity, state of charge, depth of discharge, state of health and voltage of battery packs, battery modules and cells within a rechargeable energy storage system may not be equivalent. Differences may occur even with matched battery packs, battery pack modules, and cells of equivalent age, chemistry and design capacity due to factors such as load imbalance, cell capacity mismatch, short or long term discharge history differentials, temperature gradients, high voltage bus wiring, nonuniform degradation, leakage currents, and others. Such differences may manifest at any point within a life cycle of a rechargeable energy storage system and during operative use, including light or heavy discharge or light or heavy recharge, or during quiescent periods when no or minimal charge flows through the rechargeable energy storage system.

Large scale rechargeable energy storage systems may include multiple battery packs including multiple battery pack modules themselves including multiple cells. Such rechargeable energy storage systems may include hundreds of cells. Charge imbalance in even one cell or group of cells may compromise the performance of an entire large scale rechargeable energy storage system thereby limiting effective capacity and requiring charge and discharge adaptation of the entire rechargeable energy storage system to avoid undesirable events including irreversible damage to the rechargeable energy storage system.

Certain techniques are practiced for balancing rechargeable energy storage systems including, for example, dissipative balancing and active balancing. Dissipative balancing is often practiced at the cell level and includes reducing a cell state of charge by controlling cell current through a resistive load to bring cells with higher or excessive states of charge into parity with other cells within the rechargeable energy storage system. Dissipative balance however wastes energy, heats the rechargeable energy storage system and only provides unidirectional balancing through charge reductions. Active balancing improves upon dissipative balancing by recapturing energy of excess cell charge by transferring charge from higher states of charge cells to lower states of charge cells or from higher states of charge cells to other energy storage systems or sub-systems. Both dissipative balancing and active balancing however may be relatively slow due to power and current limitations. Therefore, alternative balancing techniques for a rechargeable energy storage system which may improve speed and efficiency are desirable.

SUMMARY

In one exemplary embodiment, a rechargeable energy storage system may include a series arrangement of a plurality of batteries coupled to a first DC bus at a first DC voltage, a DC to DC converter including a multi-input DC input stage coupled to a multi-output DC output stage, the multi-input DC input stage including multiple distributed DC inputs, each distributed DC input coupled to a respective one of the plurality of batteries, and the multi-output DC output stage including multiple aggregated DC outputs, and at least one controllable switch for coupling one or more of the multiple aggregated DC outputs to one or more other DC buses.

In addition to one or more of the features described herein, the one or more other DC buses may include a second DC bus at a second DC voltage less than the first DC voltage.

In addition to one or more of the features described herein, the one or more other DC buses may include a second DC bus at a second DC voltage less than the first DC voltage and a third DC bus at a third DC voltage intermediate the first DC voltage and the second DC voltage.

In addition to one or more of the features described herein, the one or more other DC buses may include multiple other DC buses, and wherein the at least one controllable switch selectively couples the other DC buses to one or multiple ones of the multiple aggregated DC outputs.

In addition to one or more of the features described herein, the one or more other DC buses may include one other DC bus, and wherein the at least one controllable switch selectively couples the other DC bus to one or multiple ones of the multiple aggregated DC outputs.

In addition to one or more of the features described herein, the one or more other DC buses may include a respective isolated converter.

In addition to one or more of the features described herein, the DC to DC converter may further include an AC link section intermediate the multi-input DC input stage and the multi-output DC output stage.

In addition to one or more of the features described herein, each aggregated DC output may include multiple distributed DC outputs, each distributed DC output coupled to a respective distributed DC input, wherein the multiple distributed DC outputs are aggregated in series.

In addition to one or more of the features described herein, each aggregated DC output may include multiple distributed DC outputs, each distributed DC output coupled to a respective distributed DC input, wherein the multiple distribute DC outputs are aggregated in parallel.

In addition to one or more of the features described herein, the DC to DC converter may include an AC link section having a plurality of distributed AC input windings and a corresponding plurality of distributed AC output windings, each distributed AC input winding coupled to a respective distributed DC input and to a respective distributed AC output winding, wherein each aggregated DC output may include multiple distributed DC outputs, each distributed DC output coupled to a respective distributed AC output winding, wherein the multiple distributed DC outputs are aggregated in series.

In addition to one or more of the features described herein, the DC to DC converter may include an AC link section having a plurality of distributed AC input windings and a corresponding plurality of distributed AC output windings, each distributed AC input winding coupled to a respective distributed DC input and to a respective distributed AC output winding, wherein each aggregated DC output may include multiple distributed DC outputs, each distributed DC output coupled to a respective distributed AC output winding, wherein the multiple distributed DC outputs are aggregated in parallel.

In addition to one or more of the features described herein, the DC to DC converter may include an AC link section having a plurality of distributed AC input windings and a corresponding plurality of distributed AC output windings, each distributed AC input winding coupled to a respective distributed DC input and to a respective distributed AC output winding, wherein each aggregated DC output is coupled to multiple distributed AC output windings, wherein the multiple distributed AC output windings are aggregated in series.

In another exemplary embodiment, a rechargeable energy storage system may include a series arrangement of a plurality of batteries coupled to a first DC bus at a first DC voltage, a DC to DC converter including a plurality of distributed converters, each distributed converter having a respective distributed DC input and a respective distributed DC output, each distributed DC input coupled to a respective one of the plurality of batteries, multiple aggregated DC outputs, each aggregated DC output including a respective aggregated set of distributed DC outputs, and at least one controllable switch for coupling one or more of the multiple aggregated DC outputs to one or more other DC buses.

In addition to one or more of the features described herein, the DC to DC converter may further include a respective AC link section intermediate each multi-input DC input and each multi-output DC output.

In addition to one or more of the features described herein, the distributed DC outputs of each aggregated set of distributed DC outputs are aggregated in series.

In addition to one or more of the features described herein, the distributed DC outputs of each aggregated set of distributed DC outputs are aggregated in parallel.

In yet another exemplary embodiment, an electrified vehicle may include an electric propulsion system including a rechargeable energy storage system, an electric motor, and a power inverter coupled between the electric motor and a first DC bus, the rechargeable energy storage system including a series arrangement of a plurality of batteries coupled to the first DC bus at a first DC voltage, an isolated DC to DC converter including a multi-input DC input stage coupled to a multi-output DC output stage, the multi-input DC input stage including multiple distributed DC inputs, each distributed DC input coupled to a respective one of the plurality of batteries, and the multi-output DC output stage including multiple aggregated DC outputs, and at least one controllable switch for coupling one or more of the multiple aggregated DC outputs to one or more other DC buses.

In addition to one or more of the features described herein, the one or more other DC buses may include a second DC bus at a second DC voltage less than the first DC voltage.

In addition to one or more of the features described herein, the one or more other DC buses may include a second DC bus at a second DC voltage less than the first DC voltage and a third DC bus at a third DC voltage intermediate the first DC voltage and the second DC voltage.

In addition to one or more of the features described herein, the one or more other DC buses may include multiple other DC buses, and wherein the at least one controllable switch selectively couples the other DC buses to one or multiple ones of the multiple aggregated DC outputs.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 schematically illustrates alternative embodiments for battery balancing, in accordance with the present disclosure;

FIGS. 5A-5D illustrate exemplary embodiments of one or more switches, in accordance with the present disclosure;

DETAILED DESCRIPTION

Figure 1:
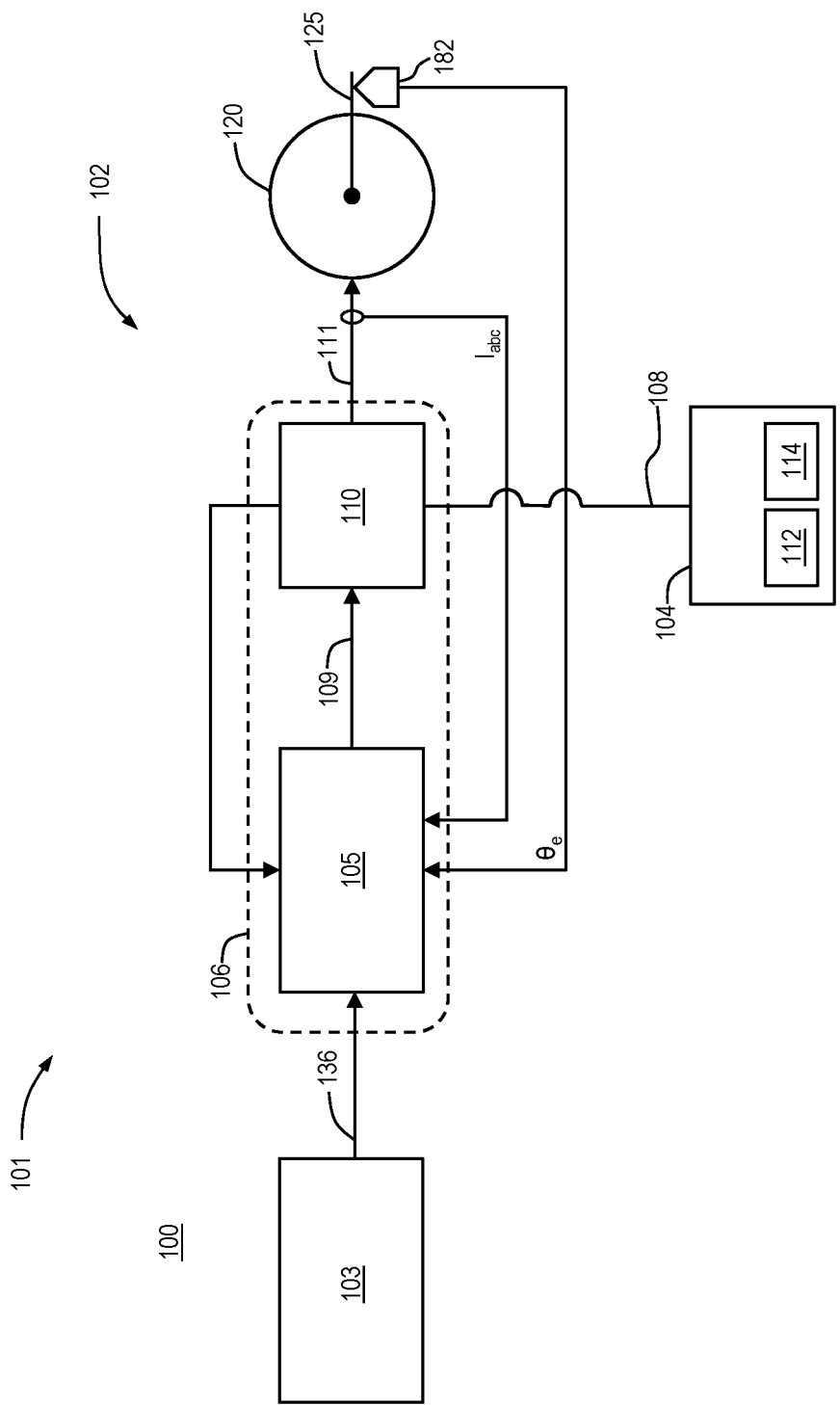
FIG. 1 illustrates an electric propulsion system on a vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an electric propulsion system 101 on a vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, an alternating current (AC) motor (motor) 120 and a traction power inverter module (TPIM) 106 including a motor controller 105 and a power inverter 110. The motor 120 may include a stator and a rotor coupled to a motor output shaft 125 and position sensor 182, for example a variable reluctance resolver or an encoder. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the inverter module 110 that controls the motor 120.

The motor output shaft 125 may transfer torque between the motor 120 and driveline components (not illustrated), for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105.

The motor controller 105 may include one or more control modules. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The RESS 104 may also include a battery manager module 114. The RESS 104 may include one or more battery packs allowing for flexibility in configurations and adaptation to application requirements. Battery packs may be constructed from a plurality of battery pack modules allowing for flexibility in configurations and adaptation to application requirements. Battery pack modules may be constructed from a plurality of cells allowing for flexibility in configurations and adaptation to application requirements. For example, in vehicular uses, the RESS 104 may be modular to the extent that the number and arrangement of battery packs, battery pack modules and cells may be varied to accommodate energy density or range objectives of a particular vehicle platform, market requirement, intended use, cost target, packaging constraint, etc. Battery packs, battery pack modules and cells may be variously and selectively configured in accordance with desired propulsion architecture and charging functions. It is understood that the RESS 104 may be reconfigurable at any level of integration including battery pack, battery pack module and cell.

The motor 120 may be a poly-phase AC motor receiving poly-phase AC power over a poly-phase motor control power bus (AC bus) 111 which is coupled to the power inverter 110. In one embodiment, the motor 120 is a three-phase motor and the power inverter 110 is a three-phase inverter. The power inverter 110 may include a plurality of solid-state switches. The power inverter 110 couples to DC power over the HV DC bus 108 (DC input voltage ($V_{dc}$)) from the RESS 104, for example at 400 volts. The motor controller 105 is coupled to the power inverter 110 for control thereof. The power inverter 110 electrically connects to stator phase windings of a three-phase stator winding of the motor 120 via the AC bus 111, with electric current monitored on two or three of the phase leads thereof. The power inverter 110 may be configured with suitable control circuits including paired power transistors (e.g., IGBTs) for transforming high-voltage DC voltage on the HV DC bus 108 to high-voltage three-phase AC voltage ($V_{abc}$) on the AC bus 111 and transforming high-voltage three-phase AC voltage ($V_{abc}$) on the AC bus 111 to high-voltage DC voltage on the HV DC bus 108. The power inverter 110 may employ any suitable pulse width modulation (PWM) control, for example sinusoidal pulse width modulation (SPWM) or space vector pulse width modulation (SVPWM), to generate switching vector signals ($S_{abc}$) 109 to convert stored DC electric power originating in the battery pack 112 of the RESS 104 to AC electric power to drive the motor 120 to generate torque. Similarly, the inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals ($S_{abc}$) 109 from motor controller 105 and control inverter states to provide the motor drive and regeneration functionality. Switching vector signals ($S_{abc}$) 109 may also be referred to herein as conduction commands.

Control of the power inverter 110 may include high frequency switching of the solid-state switches in accordance with the PWM control. A number of design and application considerations and limitations determine inverter switching frequency and PWM control. Inverter controls for AC motor applications may include fixed switching frequencies, for example switching frequencies around 10-12 kHz and PWM controls that minimize switching losses of the IGBTs or other power switches of the power inverter 110.

Figure 2:
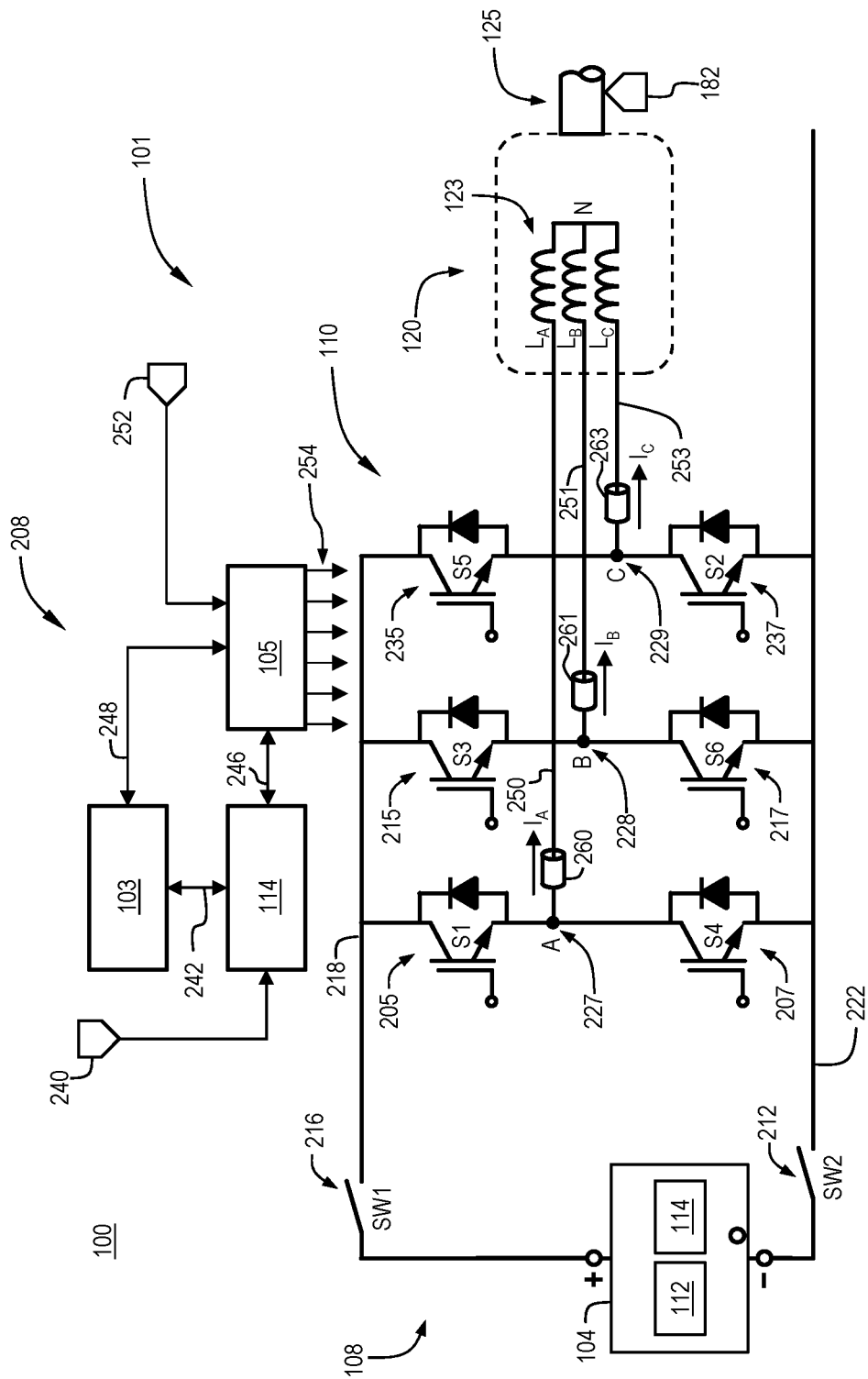
FIG. 2 illustrates an electric propulsion system and control system on a vehicle, in accordance with one or more embodiments.

With additional reference to FIG. 2, the electric propulsion system 101 on the vehicle 100 may include a control system 208 including one or more electronic control units (ECU), for example the vehicle controller 103, the battery manager module 114, and the motor controller 105. The control system 208 may be responsible for carrying out functions related to the electric propulsion system 101 monitoring, control and diagnostics, including RESS charge control or supervision, based upon a plurality of inputs. The vehicle controller 103 may include one or more ECUs and may be responsible for supervising, interpreting various user and environmental inputs, information arbitration, and issuing and receiving control commands and requests to and from various other ECUs, including the battery manager module 114 and the motor controller 105 as illustrated by communication lines 242, 246 and 248. The battery manager module 114 may receive a plurality of inputs 240 related to the RESS 104 including, for example, voltage, current and temperature at cell, module, pack and RESS levels at various module and pack configurations, and may determine state of charge (SOC), depth of discharge (DOD) state of health (SOH) and other metrics at cell, module, pack and RESS levels at various module and pack configurations. The battery manager module 114 may be primarily responsible for charge and discharge control, monitoring and diagnostics of the RESS 104. The motor controller 105 may receive various inputs 252 used in the monitoring, control and diagnosis of the motor 120 and power inverter 110, including phase currents $I_a$, $I_b$ and $I_c$ from respective current sensors 260, 261 and 263 and rotor position information from the position sensor 182. The motor controller 105 may control the motor 120 by issuing conduction commands 254 to inverter solid-state switches S1 205, S2 237, S3 215, S4 207, S5 235 and S6 217. The individual conduction commands are issued for each switch S1-S6 in the form of PWM signals from the motor controller 105. Any suitable solid-state device may be employed as switches S1-S6 including, for example, solid-state relays and transistors such as Si IGBTs, Si MOSFETs, SiC MOSFETs, GaN HEMTs, SiC JFETs, Diamond, Gallium Oxide and other Wide Band Gap (WBG) semiconductor-based power switch devices. Each switch S1-S6 may also have an associated anti-parallel diode either as a discrete component or integrated with each switch S1-S6. In accordance with one embodiment, the battery manager module 114 may be responsible for monitoring and diagnosis of the RESS 104, for discharge and charge control including during propulsion operation and for electric power transfers from and to off-vehicle power sources.

The power inverter 110 includes a positive DC rail 218, a negative DC rail 222 and a plurality of phase legs therebetween. Phase legs in the exemplary 3-phase power inverter 110 include switches S1 and S4 (phase leg A) coupled at node 227 (phase pole A), Switches S3 and S6 (phase leg B) coupled at node 228 (phase pole B), and switches S5 and S2 (phase leg C) coupled at node 229 (phase pole C). Switches S1 205, S3 215 and S5 235 may be referred to as upper solid-state switches as they couple to the positive DC rail 218. Switches S2 237, S4 207 and S6 217 may be referred to as lower solid-state switches as they couple to the negative DC rail 222. Phase pole A (node 227) couples to a phase winding $L_A$ of a stator winding 123 of the motor 120 via line 250. Phase pole B (node 228) couples to a phase winding $L_B$ of the stator winding 123 of the motor 120 via line 251. And phase pole C (node 229) couples to a phase winding $L_C$ of the stator winding 123 of the motor 120 via line 253. All phase windings $L_A$, $L_B$ and $L_C$ are coupled at a common neutral point N of the stator winding 123. The terminal ends of the phase windings $L_A$, $L_B$ and $L_C$ opposite the common neutral point N may be referred to as phase terminals. Each line 250, 251 and 253 may have an associated current sensor 260, 261 and 263, respectively, for sensing phase currents. The HV DC bus 108 (FIG. 1) may be selectively coupled across the positive DC rail 218 and the negative DC rail 222 by respective high current disconnect switches. The HV DC bus 108 may include conductors such as bars and cables statically or selectively (e.g., through high current disconnect switches) coupled to positive and negative terminals of the RESS 104 High current disconnect switch SW1 216 is controllable to couple and decouple the positive DC rail 218 and the RESS 104 positive terminal over the HV DC bus 108. Likewise, high current disconnect switch SW2 212 is controllable to couple and decouple the negative DC rail 222 and the RESS 104 negative terminal over the HV DC bus 108. High current disconnect switches SW1 and SW2 may be referred to herein as DC contactors 216, 212 to distinguish them from the power inverter 110 solid-state switches S1-S6 and may be electromechanical relays or solid-state switches.

The embodiments herein are described in application at the cell level within a RESS 104 including a battery pack wherein battery packs are understood to include one or more battery pack modules which may include one or more cells. However, such embodiments are described by way of non-limiting example. The subject matter of the disclosure may be practiced at any level of integration including battery pack, battery module and cell, and further including parallel combinations of battery packs, battery modules and cells. Therefore, the term "battery" may refer to battery pack, battery pack module or cell or combinations or groupings thereof.

With reference to FIG. 3, alternative embodiments are schematically illustrated for battery balancing carried out within a RESS 104 coupled to a power inverter 110 over a HV DC bus 108 to provide electrical power to, or receive electrical power from, an electric machine (e.g., motor 120). The RESS 104 may include a plurality of batteries (e.g., cells, battery pack modules, battery packs), arranged in series and coupled to the HV DC bus to provide a DC power source at a first voltage, for example at 400 volts, to vehicle systems, for example the power inverter 110 of the electric propulsion system 101. A DC to DC converter 301 may in one embodiment be isolated. The DC to DC converter 301 may have multiple DC inputs 307 coupling to respective batteries within the RESS 104. The DC to DC converter 301 may have multiple DC outputs 309 which may correspond in number to the multiple DC inputs 307 or may be fewer in number through combination and aggregation. The multiple DC outputs 309 may be selectively coupled through one or more switches 311 to one or more DC buses 313 which may include DC buses other than the HV DC bus 108. The multiple DC outputs 309 may couple to the one or more DC buses 313 directly through a DC coupling 315 (e.g., bus wiring, bus bars, cables, etc.) or through an isolated DC to DC converter 317.

Figure 4:
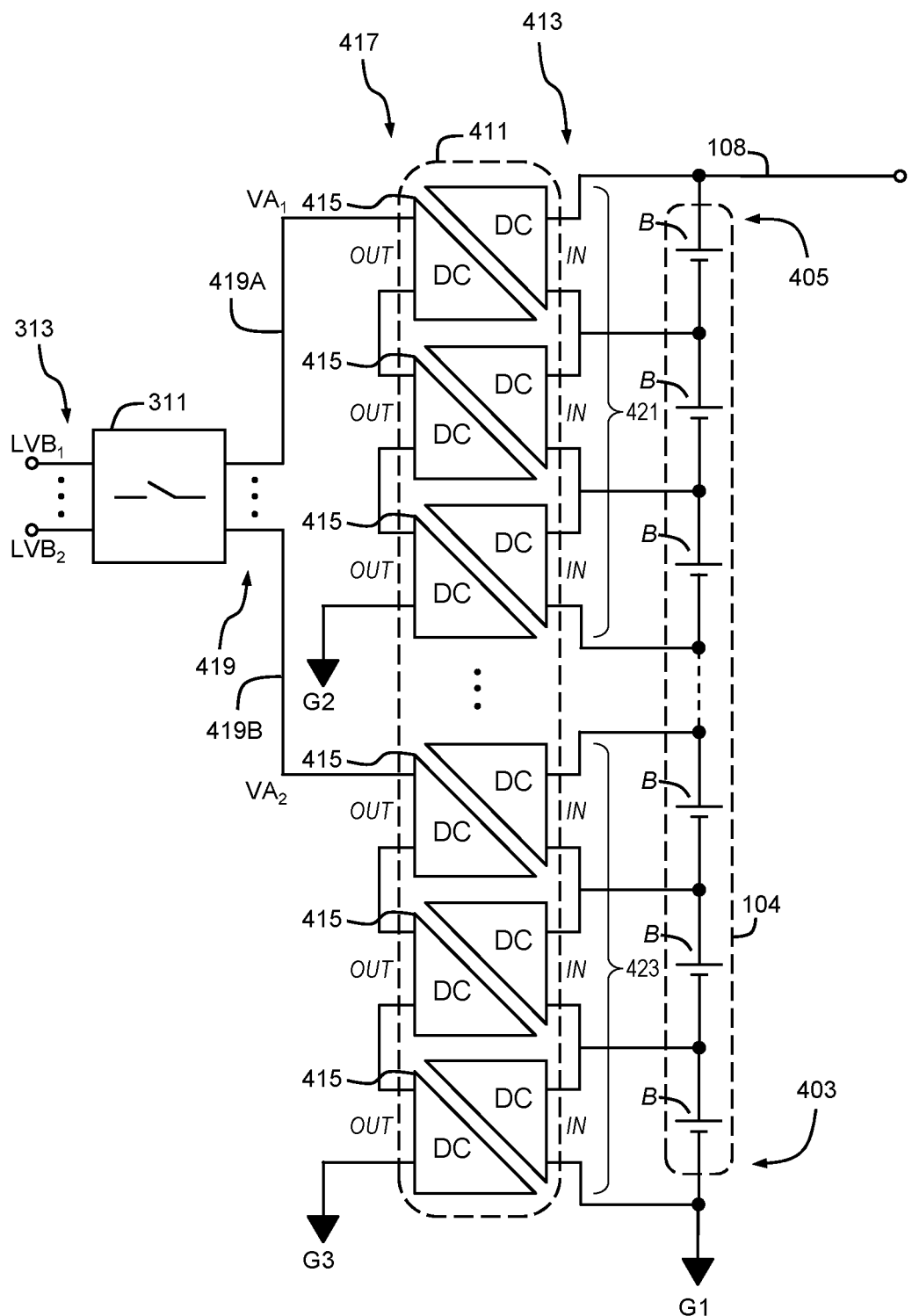
FIG. 4 illustrates an embodiment for battery balancing, in accordance with the present disclosure.

In an embodiment illustrated in FIG. 4, a RESS 104 includes a plurality of batteries (B) arranged to provide a high voltage DC source, for example 400 volts, to the HV DC bus 108. Battery as used herein is understood to mean any electrical energy storage unit of interest including individual cells, groups of cells, modules including cells or groups of cells, groups of modules, battery packs including modules, groups of modules or multiple battery packs, for example. The batteries B are arranged in series and couple at the low potential end 403 to a first ground G1 and at the high potential end 405 to the HV DC bus 108. A multi-input DC to DC converter 411 may include a multi-input DC input stage 413 including a plurality of distributed converters 415. Each of the distributed converters 415 is associated with one of the batteries B. Each of the distributed converters 415 includes a respective distributed DC input (IN) as part of the multi-input DC input stage 413 of the multi-input DC to DC converter 411. Each distributed converter 415 is coupled across one of the batteries B at the respective DC input. Converter as used herein signifies any appropriate isolated DC to DC power converter topology. Distributed as used herein in conjunction with distributed converter signifies a one to one association of distributed converters to batteries. That is, a single distributed converter is coupled across each battery. The multi-input DC to DC converter 411 may include a multi-output DC output stage 417 including a plurality of distributed converters 415. Each of the distributed converters 415 includes a respective distributed DC output (OUT) as part of the multi-output DC output stage 417. In this regard, each of the distributed DC outputs is coupled to a respective DC input. The designation herein of input or output with respect to multi-input DC input stage 413, multi-output DC output stage 417, distributed DC inputs (IN) and distributed DC outputs (OUT) is for explanatory distinction only and is not limiting with respect to functional direction of the multi-input DC to DC converter 411, it being understood that the multi-input DC to DC converter 411 may be bi-directional.

The multi-output DC output stage 417 includes multiple aggregated DC outputs 419. Aggregated as used herein in conjunction with aggregated DC outputs signifies that multiple distributed converters 415 contribute to an aggregated DC output. That is, the distributed DC outputs from multiple distributed converters are aggregated into an aggregated DC output. In the present embodiment, two aggregated DC outputs 419A and 419B are illustrated though it is understood that two is merely exemplary. In the present embodiment, each of the aggregated DC outputs 419A and 419B combine the distributed DC outputs from three distributed converters 415 though it is understood that three is merely exemplary. In the present embodiment, for the aggregated DC output 419A, the distributed DC outputs from a group of three 421 distributed converters are aggregated or combined in series with the distributed DC output from the distributed converter having the lowest potential battery coupling position providing a second ground G2 and the DC output from the distributed converter having the highest potential battery coupling position providing a first aggregated DC output 419A at a voltage $VA_1$. Similarly, for the aggregated DC output 419B, the distributed DC outputs from a group of three 423 distributed converters are aggregated or combined in series with the distributed DC output from the distributed converter having the lowest potential battery coupling position providing a third ground G3 and the DC output from the distributed converter having the highest potential battery coupling position providing a second aggregated DC output 419B at a voltage $VA_2$. The grounds G2 and G3 may be shared grounds (e.g., tied together), separate grounds (e.g., tied to separate parts of the vehicle chassis) or isolated grounds. Similarly, the grounds G2 and G3 may be shared, separate or isolated from ground G1.

In accordance with one embodiment, the multiple aggregated DC outputs 419 may be selectively coupled through one or more switches 311 to one or more DC buses 313. FIG. 4 illustrates two DC buses, $LVB_1$ and $LVB_2$ though it is understood that two is merely exemplary. In one embodiment, the DC buses $LVB_1$ and $LVB_2$ are separate from each other and from HV DC bus 108. In another embodiment, the DC buses $LVB_1$ and $LVB_2$ may be separate but not isolated from each other. In another embodiment, the DC buses $LVB_1$ and $LVB_2$ may be separate but not isolated from the HV DC bus 108. In another embodiment, the DC buses $LVB_1$ and $LVB_2$ may be isolated from the HV DC bus 108. Isolation of the DC buses $LVB_1$ and $LVB_2$ may also be provided for via an additional isolated converter in-line with the DC buses $LVB_1$ and $LVB_2$. The one or more switches 311 are controllable for coupling one or more of the multiple aggregated DC outputs 419 to one or more of the DC buses $LVB_1$ and $LVB_2$.

FIGS. 5A-5D illustrate non-limiting exemplary embodiments of one or more switches 311 for coupling one or more of the multiple aggregated DC outputs 419 to one or more of the DC buses $LVB_1$ and $LVB_2$. FIG. 5A illustrates a single switch 501 which may selectively couple one of the aggregated DC outputs 419A or 419B to a DC bus LVB, thereby sourcing the DC bus LVB by either of the aggregated DC outputs 419A or 419B. FIG. 5B illustrates two switches 503 and 505 which may selectively couple a respective one of the aggregated DC outputs 419A or 419B to a corresponding one of two DC buses $LVB_1$ and $LVB_2$, thereby sourcing each bus $LVB_1$ and $LVB_2$ by separate aggregated DC outputs 419A or 419B. FIG. 5C illustrates two switches 507 and 509 which may selectively couple a respective one of the aggregated DC outputs 419A or 419B to a DC bus LVB, thereby sourcing DC bus LVB with one or both of the aggregated DC outputs 419A or 419B. FIG. 5D illustrates two switches 511 and 513 which may selectively couple a respective one of the aggregated DC outputs 419A or 419B to a corresponding one of two DC buses $LVB_1$ and $LVB_2$. A third switch 515 may selectively couple the two buses $LVB_1$ and $LVB_2$ which allows for independent sourcing of each bus $LVB_1$ and $LVB_2$ by a respective one of the aggregated DC outputs 419A or 419B, sourcing of both buses $LVB_1$ and $LVB_2$ by either of the aggregated DC outputs 419A or 419B, or sourcing of both buses $LVB_1$ and $LVB_2$ by both of the aggregated DC outputs 419A and 419B. Other configurations of one or more switches 311 are envisioned and within the scope of coupling one or more multiple aggregated DC outputs to one or more DC buses. The one or more switches 311 may be any suitable high-current switch such as high current disconnect switches (i.e., DC contactors) or solid-state switches and may be electromechanical relays or solid-state relays.

The one or more DC buses 313 sourced by the aggregated DC outputs 419 may include one or more buses may be sourced by the multiple aggregated DC outputs 419 at voltage levels that are less than, greater than or equivalent to the HV DC bus 108 may be configured at the aggregated DC outputs 419 of the multi-input DC to DC converter 411. Bus voltages less than the HV DC bus 108 may provide vehicle accessor loads, for example at 12 volts or 48 volts. Low power requirement vehicle accessory loads such as controllers, infotainment, lighting and others may be powered by a 12 volt accessory bus. High power requirement vehicle accessory loads such as electric air conditioning compressors and electrical heating systems may be powered by a 48 volt accessory bus. Bus voltages greater than the HV DC bus 108 may also be configured at the aggregated DC outputs 419 of the multi-input DC to DC converter 411. In one embodiment, such accessory bus voltages as 12 volts and 48 volts may be configured directly at the aggregated DC outputs 419. Alternatively, aggregated DC outputs 419 may provide an intermediate voltage (e.g., 100 volts or 200 volts) and source these voltages to buses which couple additional DC to DC converters configured to output accessory voltages at 12 and 48 volts for sourcing 12 volt and 48 volt buses.

Figure 6:
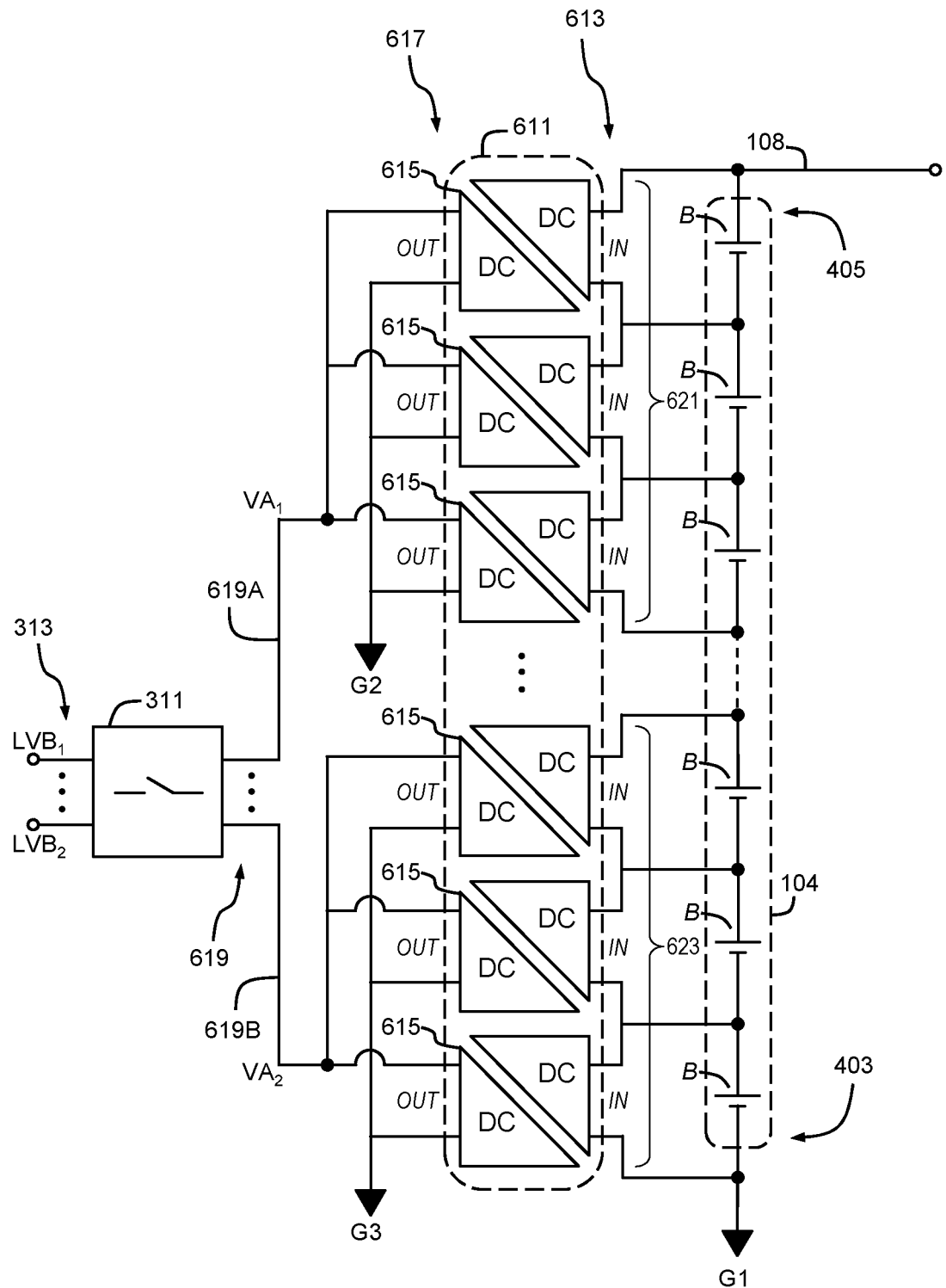
FIG. 6 illustrates an embodiment for battery balancing, in accordance with the present disclosure.

In an embodiment illustrated in FIG. 6, a RESS 104 includes a plurality of batteries (B) arranged to provide a high voltage DC source, for example 400 volts, to the HV DC bus 108. Battery as used herein is understood to mean any electrical energy storage unit of interest including individual cells, groups of cells, modules including cells or groups of cells, groups of modules, battery packs including modules, groups of modules or multiple battery packs, for example. The batteries B are arranged in series and couple at the low potential end 403 to a first ground G1 and at the high potential end 405 to the HV DC bus 108. A multi-input DC to DC converter 611 may include a multi-input DC input stage 613 including a plurality of distributed converters 615. Each of the distributed converters 615 is associated with one of the batteries B. Each of the distributed converters 615 includes a respective distributed DC input (IN) as part of the multi-input DC input stage 613 of the multi-input DC to DC converter 611. Each distributed converter 615 is coupled across one of the batteries B at the respective DC input. Converter as used herein signifies any appropriate isolated DC to DC power converter topology. Distributed as used herein in conjunction with distributed converter signifies a one to one association of distributed converters to batteries. That is, a single distributed converter is coupled across each battery. The multi-input DC to DC converter 611 may include a multi-output DC output stage 617 including a plurality of distributed converters 615. Each of the distributed converters 615 includes a respective distributed DC output (OUT) as part of the multi-output DC output stage 617. In this regard, each of the distributed DC outputs is coupled to a respective DC input. The designation herein of input or output with respect to multi-input DC input stage 613, multi-output DC output stage 617, distributed DC inputs (IN) and distributed DC outputs (OUT) is for explanatory distinction only and is not limiting with respect to functional direction of the multi-input DC to DC converter 611, it being understood that the multi-input DC to DC converter 611 may be bi-directional.

The multi-output DC output stage 617 includes multiple aggregated DC outputs 619. Aggregated as used herein in conjunction with aggregated DC outputs signifies that multiple distributed converters 615 contribute to an aggregated DC output. That is, the distributed DC outputs from multiple distributed converters are aggregated into an aggregated DC output. In the present embodiment, two aggregated DC outputs 619A and 619B are illustrated though it is understood that two is merely exemplary. In the present embodiment, each of the aggregated DC outputs 619A and 619B combine the distributed DC outputs from three distributed converters 615 though it is understood that three is merely exemplary. In the present embodiment, for the aggregated DC output 619A, the distributed DC outputs from a group of three 621 distributed converters are aggregated or combined in parallel with the distributed DC output from the distributed converter having the lowest potential battery coupling position providing a second ground G2 and the DC output from the distributed converter having the highest potential battery coupling position providing a first aggregated DC output 619A at a voltage $VA_1$. Similarly, for the aggregated DC output 619B, the distributed DC outputs from a group of three 623 distributed converters are aggregated or combined in parallel with the distributed DC output from the distributed converter having the lowest potential battery coupling position providing a third ground G3 and the DC output from the distributed converter having the highest potential battery coupling position providing a second aggregated DC output 619B at a voltage $VA_2$. The grounds G2 and G3 may be shared grounds (e.g., tied together), separate grounds (e.g., tied to separate parts of the vehicle chassis) or isolated grounds. Similarly, the grounds G2 and G3 may be shared, separate or isolated from ground G1.

In accordance with one embodiment, the multiple aggregated DC outputs 619 may be selectively coupled through one or more switches 311 to one or more DC buses 313. FIG. 6 illustrates two DC buses, $LVB_1$ and $LVB_2$ though it is understood that two is merely exemplary. In the present embodiment, DC buses $LVB_1$ and $LVB_2$ are separate from each other and from HV DC bus 108. Operation of the one or more switches 311 is discussed in more detail herein including in conjunction with FIG. 3, FIG. 4, and FIG. 5.

Figure 7:
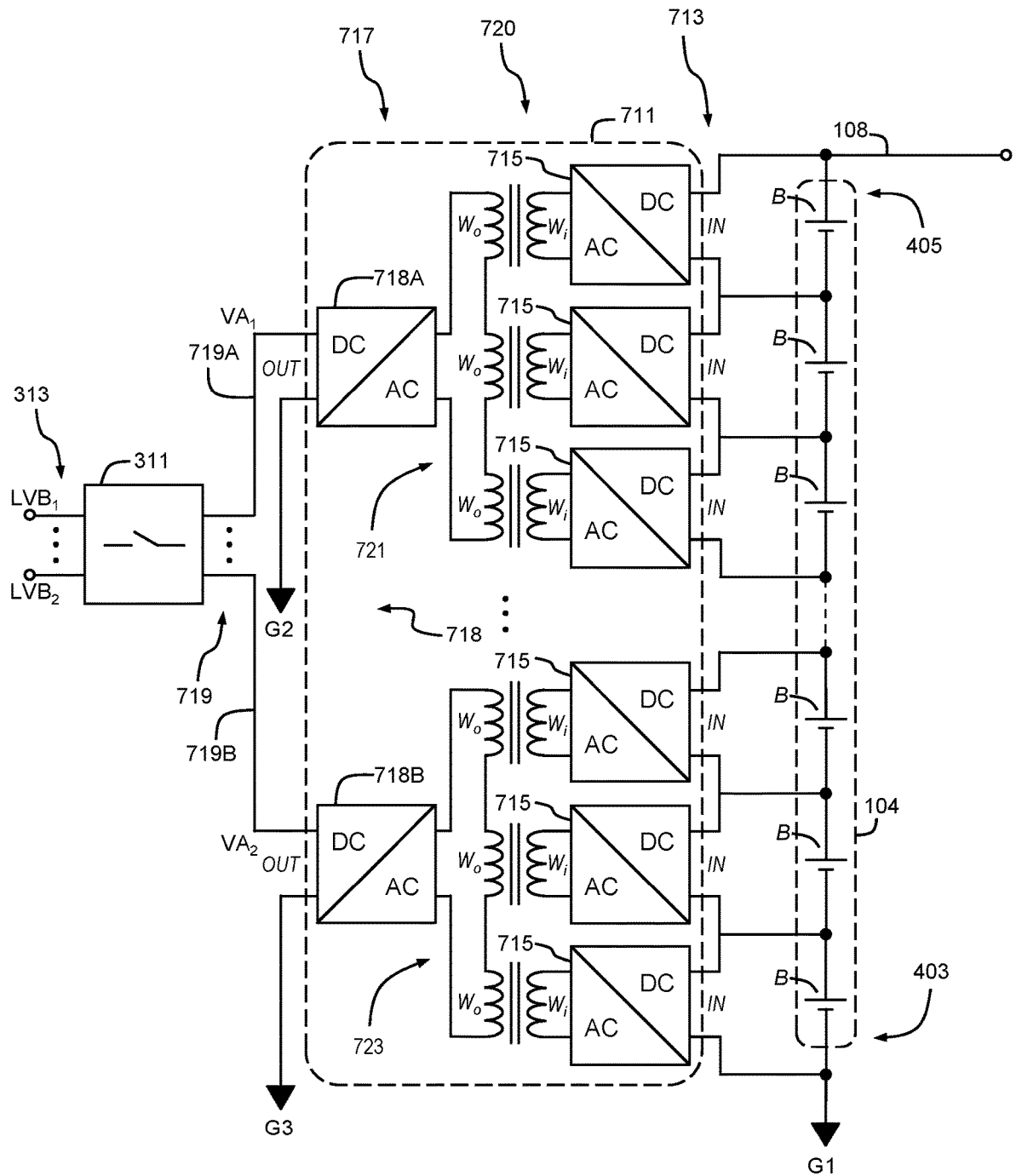
FIG. 7 illustrates an embodiment for battery balancing, in accordance with the present disclosure.

In an embodiment illustrated in FIG. 7, a RESS 104 includes a plurality of batteries (B) arranged to provide a high voltage DC source, for example 400 volts, to the HV DC bus 108. Battery as used herein is understood to mean any electrical energy storage unit of interest including individual cells, groups of cells, modules including cells or groups of cells, groups of modules, battery packs including modules, groups of modules or multiple battery packs, for example. The batteries B are arranged in series and couple at the low potential end 403 to a first ground G1 and at the high potential end 405 to the HV DC bus 108. A multi-input DC to DC converter 711 may include a multi-input DC input stage 713 including a plurality of distributed input stages 715 and respective distributed DC inputs (IN). Each of the distributed DC inputs is associated with one of the batteries B. Each of the distributed DC inputs is part of the multi-input DC input stage 713 of the multi-input DC to DC converter 711. Each distributed DC input is coupled across one of the batteries B. Converter as used herein signifies any appropriate isolated DC to DC power converter topology. Distributed as used herein in conjunction with distributed DC input signifies a one to one association of distributed DC inputs to batteries. That is, a single distributed DC input is coupled across each battery. The multi-input DC to DC converter 711 may include an AC link section 720. The AC link section 720 may include a plurality of distributed AC input windings ($W_i$) and a corresponding plurality of distributed AC output windings ($W_o$). In this regard, each of the distributed AC input windings ($W_i$) is coupled to a respective distributed DC input and is coupled (magnetically linked) to a respective distributed AC output winding ($W_o$). The multi-input DC to DC converter 711 may include a multi-output DC output stage 717 including a plurality of output stages 718 and respective DC outputs (OUT). Two such output stages 718A and 718B are illustrated though it is understood that two is merely exemplary. The designation herein of input or output with respect to multi-input DC input stage 713, multi-output DC output stage 717, output stages 718, distributed DC inputs (IN), distributed AC input windings ($W_i$) and distributed AC output windings ($W_o$) is for explanatory distinction only and is not limiting with respect to functional direction of the multi-input DC to DC converter 711, it being understood that the multi-input DC to DC converter 711 may be bi-directional.

In the illustrated embodiment of FIG. 7, each of the output stages 718A and 718B is associated with multiple distributed AC output windings ($W_o$). That is, multiple distributed AC output windings are aggregated for input into one output stage 718 of the multi-output DC output stage 717. Aggregated as used herein in conjunction with aggregated AC output windings signifies that multiple distributed AC output windings contribute to one output stage 718. In the present embodiment, three aggregated AC output windings per output stage 718 are illustrated though it is understood that three is merely exemplary. In the present embodiment, for the output stage 718A, the three distributed AC output windings 721 are aggregated or combined in series and input to the output stage 718A. Likewise, for the output stage 718B, the three distributed AC output windings 723 are aggregated or combined in series and input to the output stage 718B. The output stage 718A thus provides a DC output 719A at a voltage $VA_1$ based on the series aggregated distributed AC output windings 721 and the output stage 718B thus provides a DC output 719B at a voltage $VA_2$ based on the series aggregated distributed AC output windings 723. In this regard, the DC outputs 719A and 719B may also be referred to as aggregated DC outputs 719A and 719B recognizing that aggregation occurs within the AC link section 720 of the multi-input DC to DC converter 711 and the multi-output DC output stage 717 of the multi-input DC to DC converter 711 therefore includes multiple aggregated DC outputs 719. The output stages 718A and 718B also provide respective second and third grounds G2 and G3. The grounds G2 and G3 may be shared grounds (e.g., tied together), separate grounds (e.g., tied to separate parts of the vehicle chassis) or isolated grounds. Similarly, the grounds G2 and G3 may be shared, separate or isolated from ground G1. In an alternate embodiment, each of the distributed AC output windings ($W_o$) may be associated with its own output stage 718. In such an embodiment, the output stages 718 are considered to be distributed in correspondence with the distributed input stages 715 and aggregated DC outputs 719 may be provided by aggregation of multiple distributed output stages 718. Aggregation of the output stages 718 may be in series or parallel as discussed herein in conjunction with FIG. 4 and FIG. 6, respectively.

In accordance with one embodiment, the multiple aggregated DC outputs 719 may be selectively coupled through one or more switches 311 to one or more DC buses 313. FIG. 7 illustrates two DC buses, $LVB_1$ and $LVB_2$ though it is understood that two is merely exemplary. In the present embodiment, DC buses $LVB_1$ and $LVB_2$ are separate from each other and from HV DC bus 108. Operation of the one or more switches 311 is discussed in more detail herein including in conjunction with FIG. 3, FIG. 4, FIG. 5, and FIG. 6.

Figure 8:
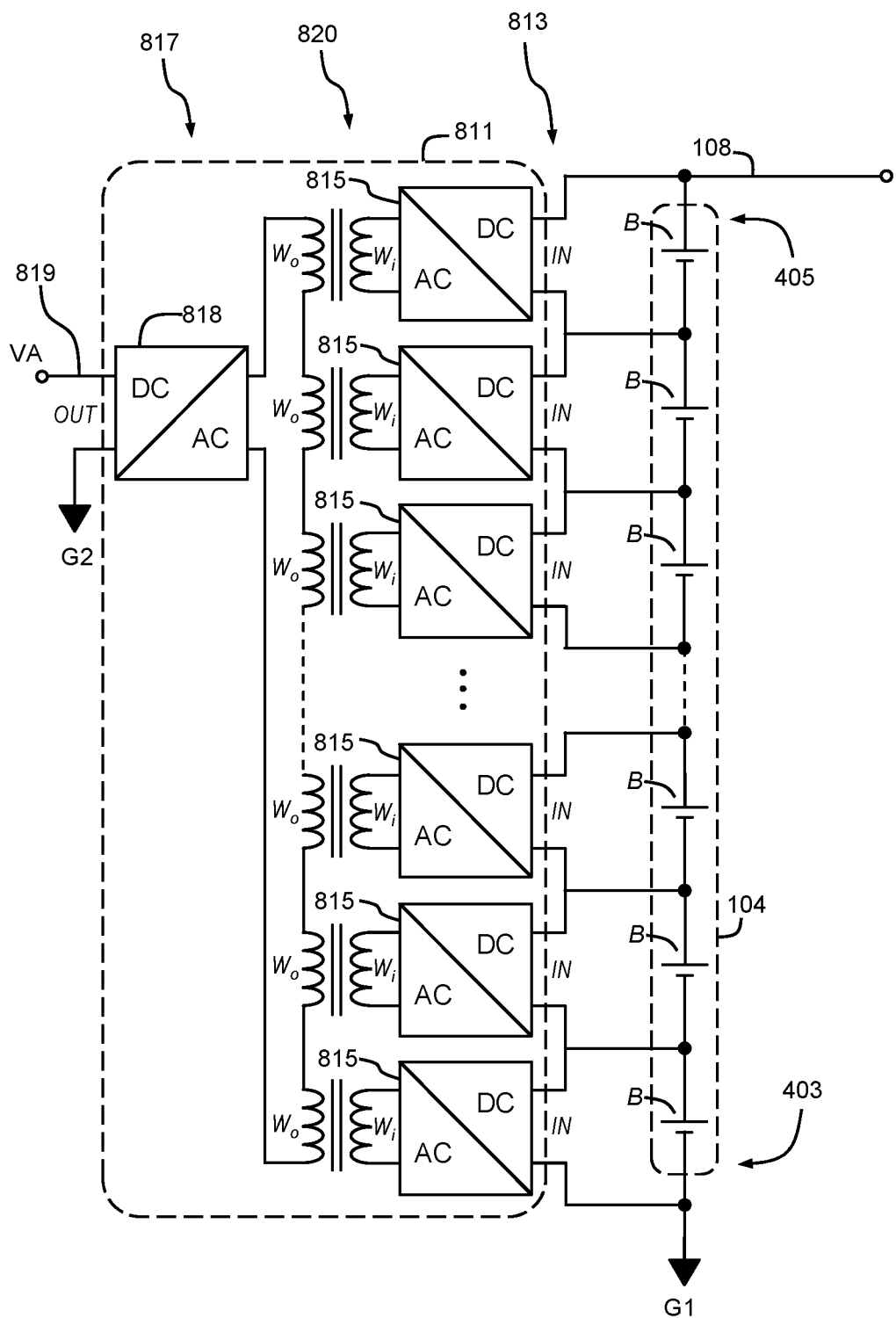
FIG. 8 illustrates an embodiment for battery balancing, in accordance with the present disclosure.

In an embodiment illustrated in FIG. 8, a RESS 104 includes a plurality of batteries (B) arranged to provide a high voltage DC source, for example 400 volts, to the HV DC bus 108. Battery as used herein is understood to mean any electrical energy storage unit of interest including individual cells, groups of cells, modules including cells or groups of cells, groups of modules, battery packs including modules, groups of modules or multiple battery packs, for example. The batteries B are arranged in series and couple at the low potential end 403 to a first ground G1 and at the high potential end 405 to the HV DC bus 108. A multi-input DC to DC converter 811 may include a multi-input DC input stage 813 including a plurality of distributed input stages 815 and respective distributed DC inputs (IN). Each of the distributed DC inputs is associated with one of the batteries B. Each of the distributed DC inputs is part of the multi-input DC input stage 813 of the multi-input DC to DC converter 811. Each distributed DC input is coupled across one of the batteries B. Converter as used herein signifies any appropriate isolated DC to DC power converter topology. Distributed as used herein in conjunction with distributed DC input signifies a one to one association of distributed DC inputs to batteries. That is, a single distributed DC input is coupled across each battery. The multi-input DC to DC converter 811 may include an AC link section 820. The AC link section 820 may include a plurality of distributed AC input windings ($W_i$) and a corresponding plurality of distributed AC output windings ($W_o$). In this regard, each of the distributed AC input windings ($W_i$) is coupled to a respective distributed DC input and is coupled (magnetically linked) to a respective distributed AC output winding ($W_o$). The multi-input DC to DC converter 811 may include a DC output stage 817 including an output stage 818 and respective DC output (OUT). The designation herein of input or output with respect to multi-input DC input stage 813, DC output stage 817, output stage 818, distributed DC inputs (IN), distributed AC input windings ($W_i$) and distributed AC output windings ($W_o$) is for explanatory distinction only and is not limiting with respect to functional direction of the multi-input DC to DC converter 811, it being understood that the multi-input DC to DC converter 811 may be bi-directional.

In the illustrated embodiment of FIG. 8, the output stage 818 is associated with all distributed AC output windings ($W_o$). That is, all distributed AC output windings are aggregated for input into a single output stage 818 of the DC output stage 817. Aggregated as used herein in conjunction with aggregated AC output windings signifies that multiple distributed AC output windings contribute to one output stage 818. In the present embodiment, all aggregated AC output windings per the output stage 818 are illustrated though it is understood that all is merely exemplary and fewer AC output windings per the output stage 818 may be aggregated. In the present embodiment, for the output stage 818, all distributed AC output windings are aggregated or combined in series and input to the output stage 818. The output stage 818 thus provides a DC output 819 at a voltage VA based on the series aggregated distributed AC output windings and the output stage 818 thus provides a DC output 819 at a voltage VA based on the series aggregated distributed AC output windings. In this regard, the DC output 819 may also be referred to as an aggregated DC output 819 recognizing that aggregation occurs within the AC link section 820 of the multi-input DC to DC converter 811 and the DC output stage 817 of the multi-input DC to DC converter 811 therefore includes a single aggregated DC output 819. The output stage 818 also provides a second ground G2. The grounds G2 may be shared, separate or isolated from ground G1. In an alternate embodiment, each of the distributed AC output windings ($W_i$) may be associated with its own output stage 818. In such an embodiment, the multiple output stages 818 are considered to be distributed in correspondence with the distributed input stages 815 and multiple DC outputs 819 may be provided by the multiple distributed output stages 818. Aggregation of such multiple output stages 818 may be in series or parallel as discussed herein in conjunction with FIG. 4 and FIG. 6, respectively.

Figure 9:
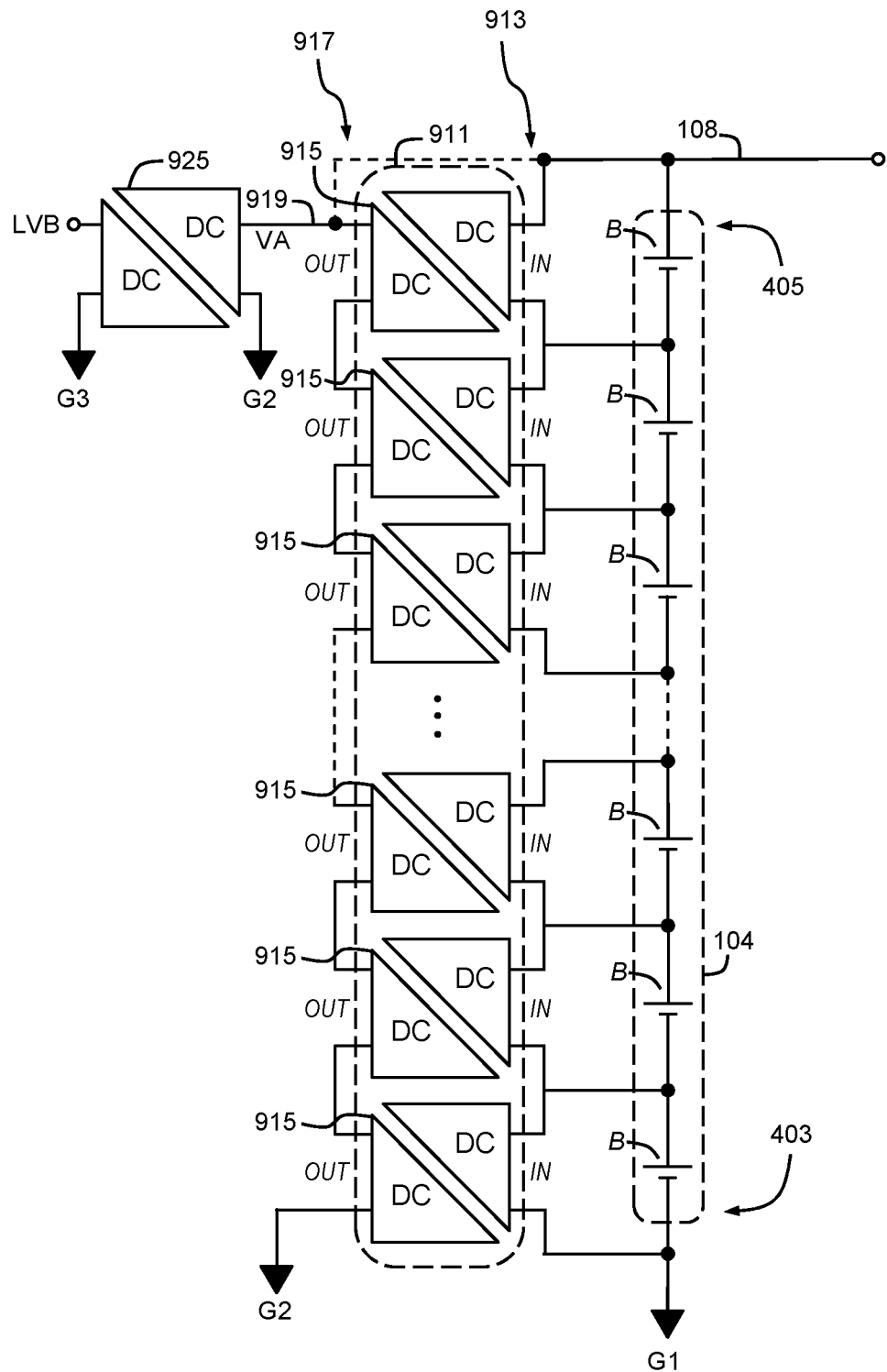
FIG. 9 illustrates an embodiment for battery balancing, in accordance with the present disclosure.

In an embodiment illustrated in FIG. 9, a RESS 104 includes a plurality of batteries (B) arranged to provide a high voltage DC source, for example 400 volts, to the HV DC bus 108. Battery as used herein is understood to mean any electrical energy storage unit of interest including individual cells, groups of cells, modules including cells or groups of cells, groups of modules, battery packs including modules, groups of modules or multiple battery packs, for example. The batteries B are arranged in series and couple at the low potential end 403 to a first ground G1 and at the high potential end 405 to the HV DC bus 108. A multi-input DC to DC converter 911 may include a multi-input DC input stage 913 including a plurality of distributed converters 915. Each of the distributed converters 915 is associated with one of the batteries B. Each of the distributed converters 915 includes a respective distributed DC input (IN) as part of the multi-input DC input stage 913 of the multi-input DC to DC converter 911. Each distributed converter 915 is coupled across one of the batteries B at the respective DC input. Converter as used herein signifies any appropriate isolated DC to DC power converter topology. Distributed as used herein in conjunction with distributed converter signifies a one to one association of distributed converters to batteries. That is, a single distributed converter is coupled across each battery. The multi-input DC to DC converter 911 may include a DC output stage 917 including a plurality of distributed converters 915. Each of the distributed converters 915 includes a respective distributed DC output (OUT) as part of the DC output stage 917. In this regard, each of the distributed DC outputs is coupled to a respective DC input. The designation herein of input or output with respect to multi-input DC input stage 913, DC output stage 917, distributed DC inputs (IN) and distributed DC outputs (OUT) is for explanatory distinction only and is not limiting with respect to functional direction of the multi-input DC to DC converter 911, it being understood that the multi-input DC to DC converter 911 may be bi-directional.

The DC output stage 917 includes an aggregated DC output 919. Aggregated as used herein in conjunction with aggregated DC output signifies that multiple distributed converters 915 contribute to an aggregated DC output. That is, the distributed DC outputs from multiple distributed converters are aggregated into an aggregated DC output. In the present embodiment, a single aggregated DC output is illustrated though it is understood that one is merely exemplary. In the present embodiment, the aggregated DC output 919 combines the distributed DC outputs from all distributed converters 915 though it is understood that all is merely exemplary and fewer distributed converters may be aggregated. In the present embodiment, all distributed converters 915 are aggregated or combined in series. The aggregated DC output 919 thus provides a DC output at a voltage VA based on the series aggregated distributed converters 915. The aggregated DC output 919 voltage VA may be less than, greater than or equivalent to the HV DC bus 108. Thus, if equivalent to the HV DC bus voltage, the aggregated DC output 919 may be coupled to the HV DC bus 108. In such an arrangement, the aggregated DC output 919 may also be coupled to an isolated converter 925 to provide a different voltage to another DC bus LVB. Otherwise, the aggregated DC output 919 may not be coupled to the HV DC bus 108 but be coupled directly to another DC bus LVB or to an isolated converter 925 to provide a different voltage to the other DC bus LVB. The DC output stage 917 of the multi-input DC to DC converter 911 therefore includes a single aggregated DC output 919. The DC output stage 917 also provide a second ground G2 which is the same as the input stage ground of the isolated converter 925. The isolated converter 925 provides a third ground G3 at its output stage. The grounds G2 and G3 may be shared grounds (e.g., tied together), separate grounds (e.g., tied to separate parts of the vehicle chassis) or isolated grounds. Similarly, the grounds G2 and G3 may be shared, separate or isolated from ground G1.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rechargeable energy storage system, comprising:
  a series arrangement of a plurality of batteries coupled to a first DC bus at a first DC voltage;
  a DC to DC converter comprising:
    a multi-input DC input stage coupled to a multi-output DC output stage;
    the multi-input DC input stage including multiple distributed DC inputs, each distributed DC input coupled to a respective one of the plurality of batteries; and
    the multi-output DC output stage including multiple aggregated DC outputs; and
  at least one controllable switch for coupling one or more of the multiple aggregated DC outputs to one or more other DC buses;
  wherein each aggregated DC output comprises multiple distributed DC outputs, each distributed DC output coupled to a respective distributed DC input, wherein the multiple distributed DC outputs are aggregated in series.

2. The system of claim 1 wherein the one or more other DC buses comprise a second DC bus at a second DC voltage less than the first DC voltage.

3. The system of claim 1 wherein the one or more other DC buses comprise a second DC bus at a second DC voltage less than the first DC voltage and a third DC bus at a third DC voltage intermediate the first DC voltage and the second DC voltage.

4. The system of claim 1 wherein the one or more other DC buses comprise a respective isolated converter.

5. The system of claim 1 wherein the DC to DC converter further comprises an AC link section intermediate the multi-input DC input stage and the multi-output DC output stage.

6. A rechargeable energy storage system, comprising:
  a series arrangement of a plurality of batteries coupled to a first DC bus at a first DC voltage;
  a DC to DC converter comprising:
    a multi-input DC input stage coupled to a multi-output DC output stage;

the multi-input DC input stage including multiple distributed DC inputs, each distributed DC input coupled to a respective one of the plurality of batteries; and the multi-output DC output stage including multiple aggregated DC outputs; and at least one controllable switch for coupling one or more of the multiple aggregated DC outputs to one or more other DC buses;

wherein the one or more other DC buses comprise multiple other DC buses, and wherein the at least one controllable switch selectively couples the other DC buses to one or multiple ones of the multiple aggregated DC outputs.

7. The system of claim 6 wherein each aggregated DC output comprises multiple distributed DC outputs, each distributed DC output coupled to a respective distributed DC input, wherein the multiple distributed DC outputs are aggregated in parallel.

8. The system of claim 6 wherein the one or more other DC buses comprise a respective isolated converter.

9. The system of claim 6 wherein the DC to DC converter further comprises an AC link section intermediate the multi-input DC input stage and the multi-output DC output stage.

10. A rechargeable energy storage system, comprising:
a series arrangement of a plurality of batteries coupled to a first DC bus at a first DC voltage;
a DC to DC converter comprising:
a multi-input DC input stage coupled to a multi-output DC output stage;
the multi-input DC input stage including multiple distributed DC inputs, each distributed DC input coupled to a respective one of the plurality of batteries; and
the multi-output DC output stage including multiple aggregated DC outputs; and
at least one controllable switch for coupling one or more of the multiple aggregated DC outputs to one or more other DC buses;
wherein the one or more other DC buses comprise one other DC bus, and wherein the at least one controllable switch selectively couples the other DC bus to one or multiple ones of the multiple aggregated DC outputs.

11. The system of claim 10 wherein the one or more other DC buses comprise a respective isolated converter.

12. The system of claim 10 wherein the DC to DC converter further comprises an AC link section intermediate the multi-input DC input stage and the multi-output DC output stage.

13. The system of claim 10 wherein each aggregated DC output comprises multiple distributed DC outputs, each distributed DC output coupled to a respective distributed DC input, wherein the multiple distributed DC outputs are aggregated in parallel.

14. A rechargeable energy storage system, comprising:
a series arrangement of a plurality of batteries coupled to a first DC bus at a first DC voltage;
a DC to DC converter comprising:
a multi-input DC input stage coupled to a multi-output DC output stage;
the multi-input DC input stage including multiple distributed DC inputs, each distributed DC input coupled to a respective one of the plurality of batteries; and
the multi-output DC output stage including multiple aggregated DC outputs; and at least one controllable switch for coupling one or more of the multiple aggregated DC outputs to one or more other DC buses;
wherein the DC to DC converter comprises an AC link section having a plurality of distributed AC input windings and a corresponding plurality of distributed AC output windings, each distributed AC input winding coupled to a respective distributed DC input and to a respective distributed AC output winding, wherein each aggregated DC output comprises multiple distributed DC outputs, each distributed DC output coupled to a respective distributed AC output winding, wherein the multiple distributed DC outputs are aggregated in series.

15. A rechargeable energy storage system, comprising:
a series arrangement of a plurality of batteries coupled to a first DC bus at a first DC voltage;
a DC to DC converter comprising:
a multi-input DC input stage coupled to a multi-output DC output stage;
the multi-input DC input stage including multiple distributed DC inputs, each distributed DC input coupled to a respective one of the plurality of batteries; and
the multi-output DC output stage including multiple aggregated DC outputs; and
at least one controllable switch for coupling one or more of the multiple aggregated DC outputs to one or more other DC buses;
wherein the DC to DC converter comprises an AC link section having a plurality of distributed AC input windings and a corresponding plurality of distributed AC output windings, each distributed AC input winding coupled to a respective distributed DC input and to a respective distributed AC output winding, wherein each aggregated DC output is coupled to multiple distributed AC output windings, wherein the multiple distributed AC output windings are aggregated in series.

16. A rechargeable energy storage system, comprising:
a series arrangement of a plurality of batteries coupled to a first DC bus at a first DC voltage;
a DC to DC converter comprising:
a plurality of distributed converters, each distributed converter having a respective distributed DC input and a respective distributed DC output, each distributed DC input coupled to a respective one of the plurality of batteries;
multiple aggregated DC outputs, each aggregated DC output comprising a respective aggregated set of distributed DC outputs; and
at least one controllable switch for coupling one or more of the multiple aggregated DC outputs to one or more other DC buses;
wherein the DC to DC converter further comprises a respective AC link section intermediate each respective distributed DC input and each respective distributed DC output; and
wherein the distributed DC outputs of each aggregated set of distributed DC outputs are aggregated in series.

17. An electrified vehicle, comprising:
an electric propulsion system including a rechargeable energy storage system, an electric motor, and a power inverter coupled between the electric motor and a first DC bus;

the rechargeable energy storage system including a series arrangement of a plurality of batteries coupled to the first DC bus at a first DC voltage;

an isolated DC to DC converter comprising:

a multi-input DC input stage coupled to a multi-output DC output stage;

the multi-input DC input stage including multiple distributed DC inputs, each distributed DC input coupled to a respective one of the plurality of batteries; and the multi-output DC output stage including multiple aggregated DC outputs; and at least one controllable switch for coupling one or more of the multiple aggregated DC outputs to one or more other DC buses;

wherein the one or more other DC buses comprise multiple other DC buses, and wherein the at least one controllable switch selectively couples the other DC buses to one or multiple ones of the multiple aggregated DC outputs.

18. The vehicle of claim 17 wherein the one or more other DC buses comprise a second DC bus at a second DC voltage less than the first DC voltage.

19. The vehicle of claim 17 wherein the one or more other DC buses comprise a second DC bus at a second DC voltage less than the first DC voltage and a third DC bus at a third DC voltage intermediate the first DC voltage and the second DC voltage.

20. The system of claim 17 wherein the one or more other DC buses comprise a respective isolated converter.

* * * * *